United States Patent
Rajendran et al.

(10) Patent No.: US 10,366,167 B2
(45) Date of Patent: Jul. 30, 2019

(54) METHOD FOR INTERPRETATION OF CHARTS USING STATISTICAL TECHNIQUES AND MACHINE LEARNING AND CREATING AUTOMATED SUMMARIES IN NATURAL LANGUAGE

(71) Applicants: Senthil Nathan Rajendran, Bangalore (IN); Selvarajan Kandasamy, Bangalore (IN); Tejas Gowda, Bangalore (IN)

(72) Inventors: Senthil Nathan Rajendran, Bangalore (IN); Selvarajan Kandasamy, Bangalore (IN); Tejas Gowda, Bangalore (IN)

(73) Assignee: Marlabs Innovations Private Limited, Bangalore (IN)

( * ) Notice: Subject to any disclaimer, the term of this patent is extended or adjusted under 35 U.S.C. 154(b) by 0 days.

(21) Appl. No.: 15/870,326

(22) Filed: Jan. 12, 2018

(65) Prior Publication Data

US 2018/0267960 A1    Sep. 20, 2018

(30) Foreign Application Priority Data

Jan. 16, 2017   (IN) .............................. 201741001637

(51) Int. Cl.
| | |
|---|---|
| G06F 17/28 | (2006.01) |
| G06F 17/27 | (2006.01) |
| G06K 9/00 | (2006.01) |
| G06K 9/52 | (2006.01) |

(52) U.S. Cl.
CPC ...... *G06F 17/2785* (2013.01); *G06F 17/2881* (2013.01); *G06K 9/00449* (2013.01); *G06K 9/52* (2013.01)

(58) Field of Classification Search
CPC ... G06F 17/2785; G06F 17/2881; G06K 9/52; G06K 9/00449
USPC .......................................... 704/9, 10; 702/34
See application file for complete search history.

(56) References Cited

U.S. PATENT DOCUMENTS

| | | | | |
|---|---|---|---|---|
| 2015/0046099 | A1* | 2/2015 | Kamoi | G06Q 50/06 702/34 |
| 2016/0315990 | A1* | 10/2016 | Naidu | H04L 65/604 |
| 2017/0371856 | A1* | 12/2017 | Can | G06F 17/2881 |
| 2018/0357276 | A1* | 12/2018 | Ding | G06Q 10/06 |

\* cited by examiner

*Primary Examiner* — Md S Elahee

(57) ABSTRACT

Disclosed subject matter relates to data analytics including a method and system for generating a contextual summary of one or more charts. A summary generating system extracts chart data associated with each chart received from one or more sources and determines context of the chart data. The summary generating system computes statistical data of each chart by analyzing chart data based on predefined rules corresponding to the context. The form of analysis to be performed depends on the context of the chart data. Furthermore, insights of each chart are generated by mapping the statistical data with predefined narratives corresponding to the context. Finally, the summary generating system, automatically generates the contextual summary of the charts corresponding to the context of the chart data in a predefined template format using the generated insights of each of the one or more charts. The contextual summary provides holistic information of the interpreted charts.

12 Claims, 5 Drawing Sheets

US 10,366,167 B2

METHOD FOR INTERPRETATION OF CHARTS USING STATISTICAL TECHNIQUES AND MACHINE LEARNING AND CREATING AUTOMATED SUMMARIES IN NATURAL LANGUAGE

BACKGROUND

The present subject matter relates generally to data analytics, and more particularly, but not exclusively to a method and a system for generating a contextual summary of one or more charts.

Generally, Business Intelligence (BI) is a broad category of computer software solutions that enables a company or an organization to gain insights into critical operations using reporting applications and analysis tools. Therefore, charts or any representation of data in BI platforms are complex and difficult to interpret. Interpretation of charts may be possible only by people who have gained expertise in the subject matter such as data analysts, business analysts, data scientists, etc. This leads to a situation where the managers and business executives may end up spending enormous amount of time on interpreting the data rather than devising strategies to improve the performance of team and/or organization.

In the existing approach, an enterprise uses BI and data visualization tools for dashboards with different types of charts and visualizations. The reports and dashboards may help in analysing the data that is fed into the system by summarizing the enterprise data in the form of visualizations. The major drawback in the existing approach is that multiple charts are created upon analysis, to provide analysis results. Interpretation of these multiple other charts to get insights of the critical operations of the enterprise again consumes time and effort of the end user such as managers, team leaders, and business executives. Since the interpretation is manual, there exists potential scope for mistakes in interpretation of the analyzed data.

There are no existing methods or techniques that automatically analyze the data behind charts, interpret the data and present insights in the form of natural language using statistical techniques and machine learning.

BRIEF DESCRIPTION

One or more shortcomings of the prior art may be overcome and additional advantages may be provided through the present disclosure. Additional features and advantages may be realized through the techniques of the present disclosure. Other embodiments and aspects of the disclosure are described in detail herein and are considered a part of the claimed disclosure. Disclosed herein is a method of generating a contextual summary of one or more charts. The method comprises extracting, by a summary generating system, chart data associated with each of one or more charts received from one or more sources. Upon extracting the chart data, the summary generating system determines context of the chart data based on one or more attributes of the chart data and one or more characteristics corresponding to each of the one or more attributes. Further, the method computes statistical data of each of the one or more charts by analysing the chart data based on one or more predefined rules corresponding to the context of the chart data. Furthermore, the method generates insights of each of the one or more charts by mapping the statistical data with one or more predefined narratives corresponding to the context of the chart data. Finally, the method, generates the contextual summary of the one or more charts in a predefined template format corresponding to the context of the chart data using the generated insights of each of the one or more charts.

Further, the present disclosure includes a summary generating system for generating a contextual summary of one or more charts. The summary generating system comprises a processor and a memory communicatively coupled to the processor. The memory stores the processor-executable instructions, which, on execution, causes the processor to extract chart data associated with each of one or more charts received from one or more sources. Upon extracting the chart data, the processor determines context of the chart data based on one or more attributes of the chart data and one or more characteristics corresponding to each of the one or more attributes. Further, the processor computes statistical data of each of the one or more charts by analysing the chart data based on one or more predefined rules corresponding to the context of the chart data. Furthermore, the processor generates insights of each of the one or more charts by mapping the statistical data with one or more predefined narratives corresponding to the context of the chart data. Finally, the processor, generates the contextual summary of the one or more charts in a predefined template format corresponding to the context of the chart data using the generated insights of each of the one or more charts.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
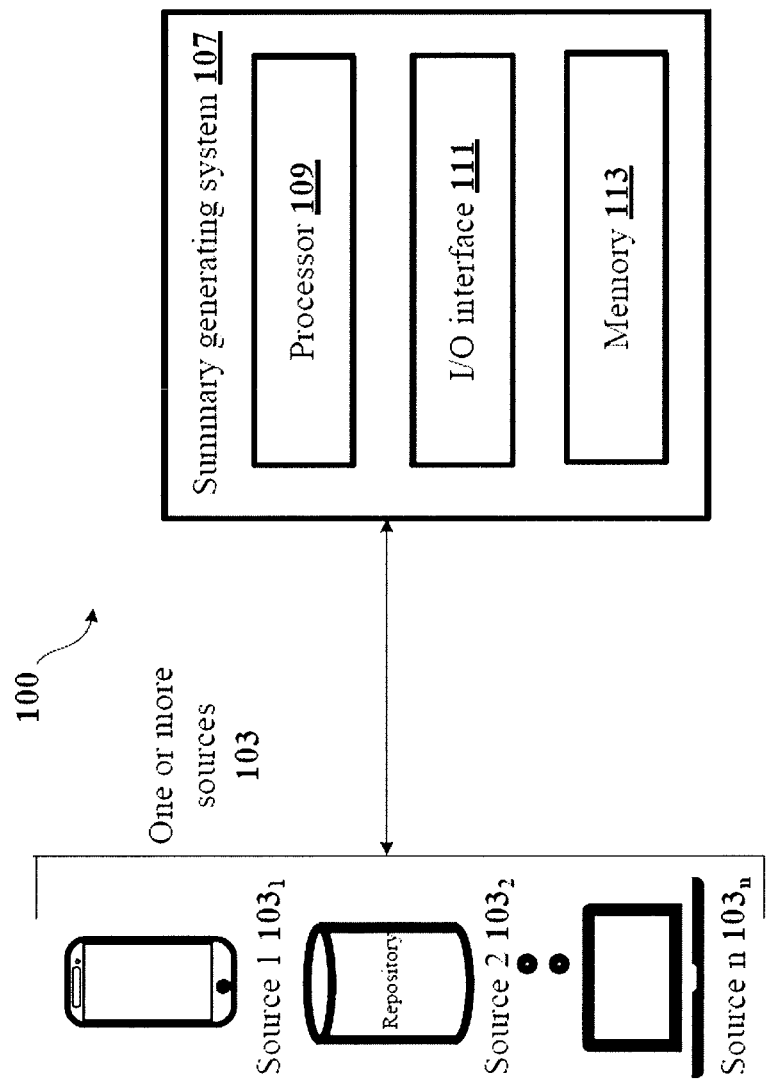
FIG. 1 shows an exemplary architecture for generating a contextual summary of one or more charts in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein are a method and a system for generating a contextual summary of one or more charts. The method comprises extracting, by the summary generating system, chart data associated with each of one or more charts received from one or more sources. Upon extracting the chart data, the summary generating system determines context of the chart data based on one or more attributes of the chart data and one or more characteristics corresponding to each of the one or more attributes. The one or more attributes may be categorical variables or numerical variables. As an example, the one or more characteristics of the categorical variables such as "Dimensions" may include, but not limited to, time dimension, non-time dimension, special dimension and the like. As an example, the one or more characteristics of the numerical variables such as "Measures" may include, but not limited to, growth rates, continuous, proportion and index/ratio. Further, the summary generating system computes statistical data of each of the one or more charts by analysing the chart data based on one or more predefined rules corresponding to the context of the chart data. The form of analysis to be performed depends on the context of the chart data. Furthermore, the summary generating system generates insights of each of the one or more charts by mapping the statistical data with one or more predefined narratives corresponding to the context of the chart data. Finally, the summary generating system, generates the contextual summary of the one or more charts corresponding to the context of the chart data in a predefined template format using the generated insights of each of the one or more charts. The contextual summary provides holistic information of the interpreted charts.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary architecture for generating a contextual summary of one or more charts in accordance with some embodiments of the present disclosure.

The architecture 100 includes source 1 1031 to source n 103n (also referred to as one or more sources 103), and a summary generating system 107. As an example, the one or more sources 103 may be a repository that stores one or more charts and computing devices such as laptops, desktops, mobiles and the like which provide real-time charts. In an embodiment, the one or more charts may include, but not limited to, bar graph, pie chart, stacked chart, tree map, scatter plot chart and trend analysis chart. Each of the one or more charts are interpreted differently based on what the chart indicates.

In some embodiments, the summary generating system 107 includes a processor 109, an Input/Output (I/O) interface 111 and a memory 113. The I/O interface 111 may be used to retrieve the one or more charts from the one or more sources 103. In some embodiments, an end user may choose the one or more charts to be retrieved from the one or more sources 103. Upon retrieving the one or more charts, the processor 109 may extract chart data associated with each of the one or more charts received from the one or more sources 103. The chart data may be the information that contributed in generating the one or more charts. Upon extracting the chart data from each of the one or more charts, the processor 109 may determine context of the chart data. In some embodiments, the context of the chart data may indicate type of the chart, type of attributes based on which the chart may be defined, type of characteristics that help in interpretation of the chart and the like. In some embodiments, the context of the chart data may be determined based on one or more attributes of the chart data and one or more characteristics corresponding to each of the one or more attributes. As an example, the one or more attributes of the chart data comprises at least one of numerical variables and categorical variables. As an example, the numerical variables may be number of "Measures" represented in the chart. As an example, the categorical variables may be number of "Dimensions" represented in the chart. As an example, the one or more characteristics of the "Dimensions" may include, but not limited to, time dimension, non-time dimension, special dimension and the like. As an example, the one or more characteristics of the "Measures" may include, but not limited to, growth rates, continuous, proportion, index/ratio. Further, the processor 109 may analyse each of the one or more charts using the chart data. The processor 109 may determine form of analysis to be performed on the chart data based on the context of the chart data. As an example, if the context of the chart data indicates a bar graph that illustrates distribution of certain entities of the enterprise, then the processor 109 may perform distribution analysis using the one or more attributes and the one or more characteristics corresponding to each of the one or more attributes. In some embodiments, the processor 109 may perform the analysis based on one or more predefined rules corresponding to the context of the chart data. Based on the form of analysis to be performed, the processor 109 may determine the appropriate one or more predefined rules and one or more predefined algorithms that should be triggered to perform the analysis. The processor 109 may obtain statistical data based on the analysis which is stored in the memory 113. Further, the processor 109 may generate insights of each of the one or more charts by mapping the statistical data with one or more predefined narratives corresponding to the context of the chart data. In some embodiments, the one or more predefined narratives provide a description of the statistical data. Finally, the processor 109 may generate contextual summary of the one or more charts corresponding to the context of the chart data in a predefined template format using the generated insights of each of the one or more charts. In some embodiments, the processor 109 may utilize techniques such as Natural Language Processing (NLP), Natural Language Generation (NLG) and the like to generate the contextual summary of the one or more charts using the generated insights. In some embodiments, the predefined template format may include headers such as "Good to know", "Key statistics" and "Key insights" for easy understanding of the end user.

Figure 2A:
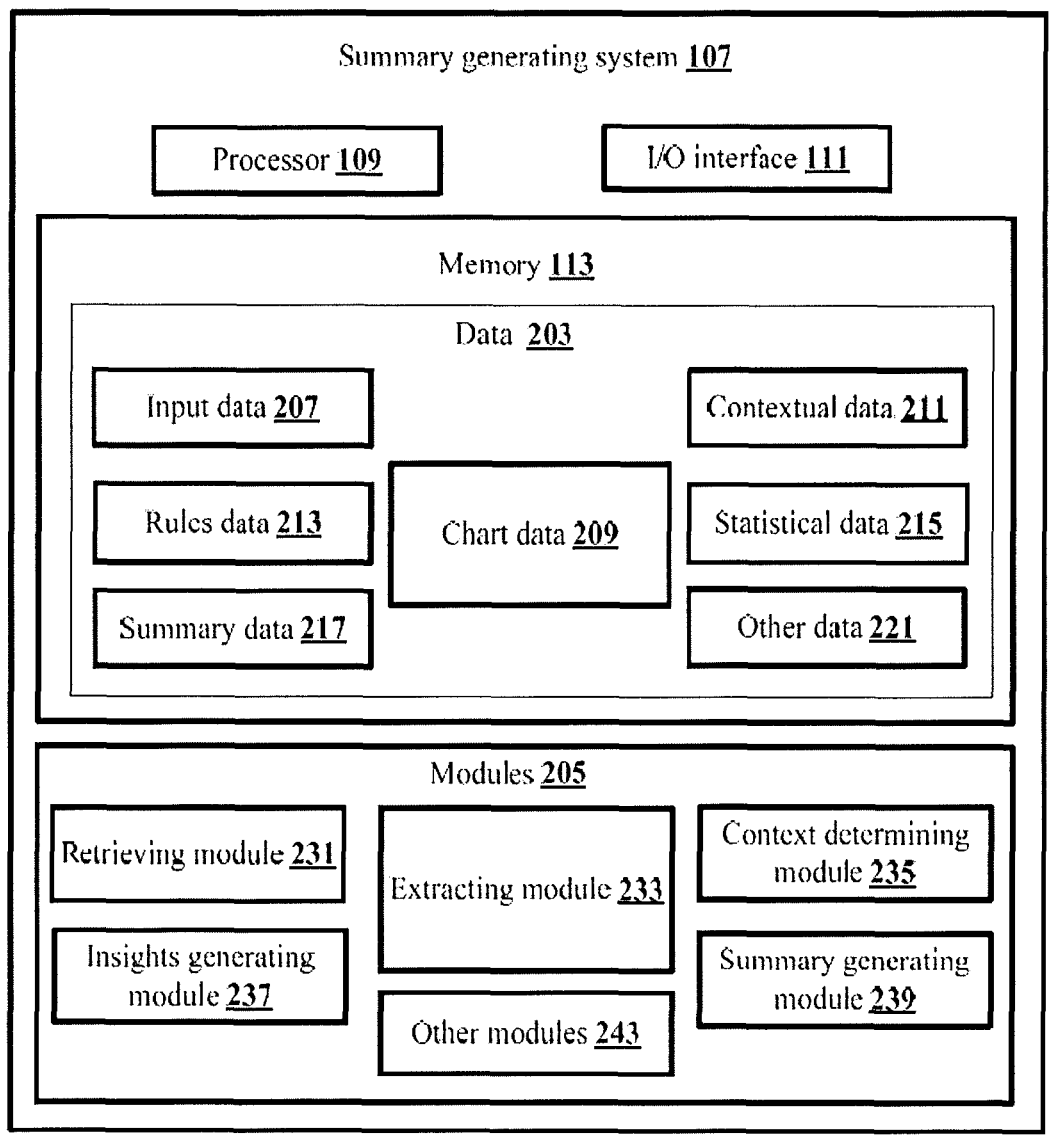
FIG. 2A shows a detailed block diagram of a summary generating system for generating contextual summary of one or more charts in accordance with some embodiments of the present disclosure.

FIG. 2A shows a detailed block diagram of a summary generating system for generating contextual summary of one or more charts in accordance with some embodiments of the present disclosure.

In some implementations, the summary generating system 107 may include data 203 and modules 205 along with the processor 109 and the I/O interface 111. As an example, the data 203 is stored in the memory 113 of the summary generating system 107 as shown in the FIG. 2A. In one embodiment, the data 203 may include input data 207, chart data 209, contextual data 211, rules data 213, statistical data 215, summary data 217 and other data 221. In the illustrated FIG. 2A, modules 205 are described herein in detail.

In some embodiments, the data 203 may be stored in the memory 113 in form of various data structures. Additionally, the data 203 can be organized using data models, such as relational or hierarchical data models. The other data 221 may store data, including temporary data and temporary files, generated by the modules 205 for performing the various functions of the summary generating system 107.

In some embodiments, the data 203 stored in the memory 113 may be processed by the modules 205 of the summary generating system 107. The modules 205 may be stored within the memory 113. In an example, the modules 205 communicatively coupled to the processor 109 configured in the summary generating system 107, may also be present outside the memory 113 as shown in FIG. 2A and implemented as hardware. As used herein, the term modules refer to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the modules 205 may include, for example, a retrieving module 231, an extracting module 233, a context determining module 235, insights generating module 237, a summary generating module 239 and other modules 243. The other modules 243 may be used to perform various miscellaneous functionalities of the summary generating system 107. It will be appreciated that such aforementioned modules 205 may be represented as a single module or a combination of different modules.

In some embodiments, the retrieving module 231 may retrieve one or more charts from one or more sources 103 associated with the summary generating system 107. As an example, the one or more sources 103 may be a repository that stores one or more charts and computing devices such as laptops, desktops, mobiles and the like that provide real-time charts. The one or more charts may be stored as the input data 207. As an example, the one or more charts may include, but not limited to, bar graph, pie chart, stacked chart, tree map, scatter plot chart and trend analysis chart.

In some embodiments, the extracting module 233 may extract chart data 209 associated with each of the one or more charts received from the one or more sources 103. The chart data may be the information that contributed in generation of the one or more charts.

In some embodiments, the context determining module 235 may determine context of the chart data 209. In some embodiments, the context of the chart data 209 may indicate type of the chart, type of attributes based on which the chart may be defined, type of characteristics that help in interpretation of the chart and the like. The context of the chart data may be stored as the contextual data 211. In some embodiments, the context of the chart data 209 may be determined based on one or more attributes of the chart data 209 and one or more characteristics corresponding to each of the one or more attributes. As an example, the one or more attributes of the chart data comprises at least one of numerical variables and categorical variables. As an example, the numerical variables may be number of "Measures" represented in the chart. As an example, the categorical variables may be number of "Dimensions" represented in the chart. As an example, the one or more characteristics of the "Dimensions" may include, but not limited to, time dimension, non-time dimension, special dimension and the like. As an example, the one or more characteristics of the "Measures" may include, but not limited to, growth rates, continuous, proportion, index/ratio. The one or more attributes and the characteristics corresponding to each of the one or more attributes are also stored as the contextual data 211.

In some embodiments, the insights generating module 237 may generate insights on the chart data 209 in natural language. Initially, the insights generating module 237 may analyse each of the one or more charts using the chart data 209. In some embodiments, the analysis of the chart data may differ for each of the one or more charts. The insights generating module 237 may determine form of analysis to be performed on the chart data 209 based on the context of the chart data 209. As an example, if the context of the chart data 209 indicates a bar graph that illustrates distribution of certain entities of the enterprise, then the insights generating module 237 may perform distribution analysis using the one or more attributes and the one or more characteristics corresponding to each of the one or more attributes. As an example, the different forms of analysis may include, but not limited to, distribution analysis, inferential analysis, predictive analysis and prescriptive analysis. In some embodiments, the distribution analysis may describe how a chosen variable is distributed, the inferential analysis may estimate what drives the chosen variable, the predictive analysis may predict how the variable would change and the prescriptive analysis may suggest how a particular metric can be improvised.

In some embodiments, the insights generating module 237 may perform the analysis based on one or more predefined rules corresponding to the context of the chart data 209. The one or more predefined rules may be specific to the form of analysis being performed on the chart data 209. The one or more predefined rules may be stored as the rules data 213. Further, the one or more predefined rules may be updated based on requirement of the end user. As an example, if a new form of analysis has to be incorporated, the one or more predefined rules corresponding to that form of analysis may be updated to the existing rules data 213. Based on the form of analysis to be performed, the insights generating module 237 may determine the appropriate one or more predefined rules and one or more predefined algorithms that should be triggered to perform the analysis. Upon performing the analysis, the insights generating module 237 may perform necessary computation to obtain statistical data 215. In some embodiments, the statistical data 215 provides mathematical values, percentages and the like by analysing the chart data 209. As an example, if the insights generating module 237 has analysed that there has been a continuous increase in sales of a product in a particular city, then the statistical data 215 might indicate the percentage increase in sales of the product in each year that contributed for continuous increase. In some embodiments, the computation may be performed using, but not limited to, R programming language and Python programming language. R is an open source programming language and software environment for statistical computing and graphics. Python is a powerful high-level, object-oriented programming language with simple easy-to-use syntax. Further, the insights generating module 237 may generate insights of each of the one or more charts by mapping the statistical data 215 with one or more predefined narratives corresponding to the context of the chart data 209. The one or more predefined narratives provide a description of the statistical data 215 in natural language such as English. In some embodiments, the insights may be generated based on statistical validity and, importance and relevance of business outcomes.

In some embodiments, the summary generating module 239 may automatically generate a contextual summary of the one or more charts in a predefined template format using the generated insights of each of the one or more charts. The contextual summary may be stored as the summary data 217. In some embodiments, the summary generating module 239 may utilize techniques such as Natural Language Processing (NLP), Natural Language Generation (NLG) and the like to generate the contextual summary of the one or more charts using the generated insights. Further, in some embodiments, the contextual summary may be presented to an end user in a predefined template format. The predefined template format may include headers such as "Good to know", "Key statistics" and "Key insights" that help in easy understanding for the end user.

Henceforth, the process for generating the contextual summary of one or more charts is explained with the help of one or more examples for better understanding of the present disclosure. However, the one or more examples should not be considered as limitation of the present disclosure.

Figure 2B:
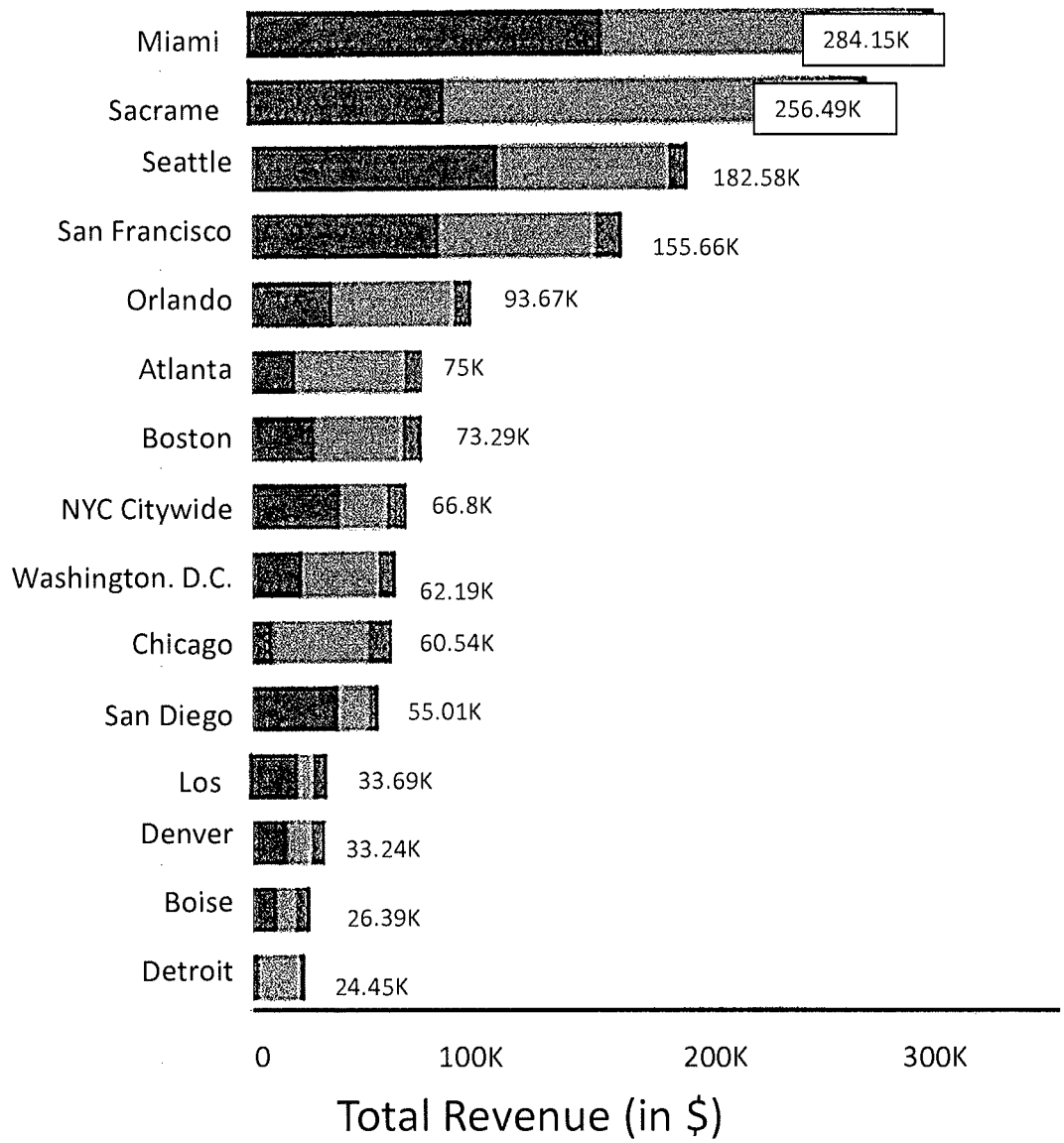
FIG. 2B shows illustrates an exemplary chart for interpretation in accordance with some embodiments of the present disclosure.

Consider an exemplary stacked bar chart as shown in the FIG. 2B. The stacked bar chart illustrates how sales/revenue is distributed across cities and the breakdown by order type. The order types illustrated in the stacked bar chart are "First timers", "Repeaters" and "Cancellations". In this scenario, the input data 207 is the stacked bar chart. Initially the chart data 209 may be extracted from the stacked bar chart. The selected stacked bar chart contains 1 measure "Sales" and 2 dimensions "City" and "Order type". As represented in the stack bar chart, the dimension "City" includes "Miami", "Sacramento", "Seattle" continued up to "Detroit". The underlying data is extracted as a Comma-Separated Values (CSV) file. Therefore, the attributes of the stacked bar chart are dimensions and measure. The measure "Sales" is a continuous variable and they are non-time dimension. Therefore, the characteristic corresponding to the dimensions "City" and "Order type" is "Non-time dimension". Based on the attributes and the characteristics corresponding to the attributes, the insights generating module 237 understands that the context of the chart "Stacked bar chart" is related to distribution. Therefore, the insights generating module 237 automatically triggers predefined rules and algorithms corresponding to the distribution analysis. The predefined rules and algorithms corresponding to the distribution analysis determines how the analysis can be performed for a single measure (Also referred as a numeric variable) "Sales" over two dimensions (Also referred as categorical variables) "City and Order type". The insights generating module 237 automatically interprets statistical data 215 and generates insights in natural language. The insights are created based on the statistical validity, importance, and relevance to business outcomes. Finally, the insights generated are aggregated in the predefined template format including three different sections "Good to know", "Key statistics" and "Key insights" as shown in the below Table 1.

| GOOD TO KNOW |
| --- |
| This chart displays total revenue (in $) for 15 cities & it ranges from 24,449 for Detroit to 284,253 for Miami. |
| Total total revenue (in $) from the 15 cities amounts to 1,483,140 with the average total revenue (in $) being 98,876 |
| There are 3 different customers (as indicated by colors with each bar) and the total revenue (in $) vary from 132,227 for Cancellation to 681,642 for Repeaters (with an average of 494,380). |

| KEY STATS |
| --- |
| Total Revenue (in $) by cities |
| Max—284,153 \| Min—24,449 \| Quartile 1—44,349.5 \| Median—66,801 \| Quartile 3—124,668.5 \| Standard Deviation—82,789.7 |

| KEY INSIGHTS |
| --- |
| Distribution of Total Revenue (in $) by City |
| The top 4 cities including Miami, Sacramento and Seattle account for 59% of total revenue (in $) |
| And, the top 7 cities account for more than three quarters (76%) of the total total revenue (in $) |
| Miami, Sacramento and Seattle contribute to 49% of overall local revenue (in $) and bottom two contribute to just 3% of overall total revenue (in $) |
| Total Revenue (in $) from Miami amounts to 284,153, which is 3 times more than the average across cities Total Revenue (in $) for 4 cities including Miami, Sacramento and Seattle are higher than the average across cities Distribution of Total Revenue (in $) by Customers |
| Repeaters contributes to 46% of the overall total revenue (in $) Interaction between City and Customers |
| 14 cities including San Diego, Sacramento and Detroit have high degree of variability in Total Revenue (in $) contribution from customers |
| Boise has relatively moderate variance in Total Revenue (in $) distribution within customers |
| With low variance in Total Revenue (in $) distribution, customers Repeaters, FirstTimers and Cancellation are relatively evenly distributed across cities |

Figure 3:
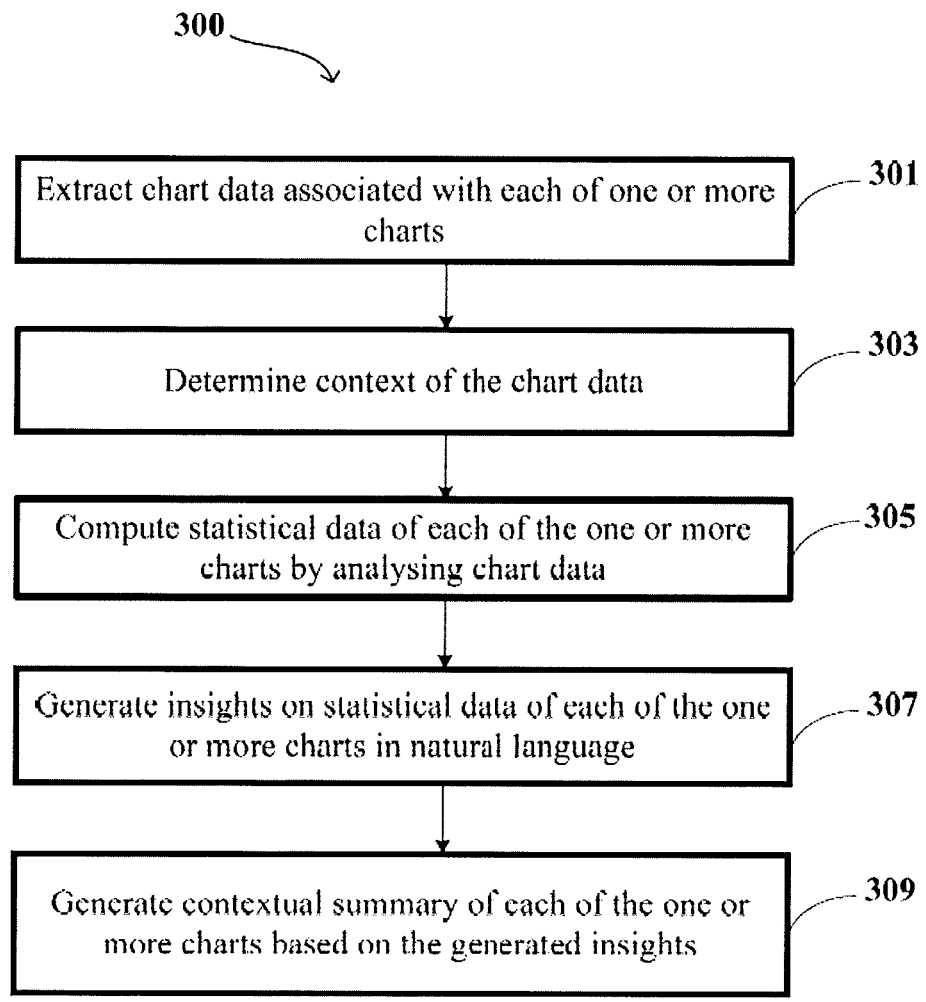
FIG. 3 shows a flowchart illustrating a method of generating a contextual summary of one or more charts in accordance with some embodiments of the present disclosure.

FIG. 3 shows a flowchart illustrating a method of generating a contextual summary of one or more charts in accordance with some embodiments of the present disclosure.

As illustrated in FIG. 3, the method 300 includes one or more blocks illustrating a method of generating a contextual summary of one or more charts. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include determining, by a processor 109 of the summary generating system 107, chart data 209 associated with each of one or more charts received from one or more sources 103. As an example, the one or more charts may include, but not limited to, the one or more charts comprise at least one of bar graph, pie chart, stacked chart, tree map, scatter plot chart, and trend analysis chart.

At block 303, the method 300 may include determining, by the processor 109, context of the chart data 209 based on one or more attributes of the chart data 209 and one or more characteristics corresponding to each of the one or more attributes. As an example, the one or more attributes of the chart data 209 comprises at least one of numerical variables and categorical variables. As an example, if the attribute is number of dimensions, then the characteristics may include, but not limited to, time dimension, non-time dimension, special dimension and the like.

At block 305, the method 300 may include, computing, by the processor 109, statistical data 215 of each of the one or more charts by analysing the chart data 209 based on one or more predefined rules corresponding to the context of the chart data 209. The processor 109 may determine form of analysis to be performed on the chart data 209 based on the context of the chart data 209. In some embodiments, the processor 109 may perform the analysis based on one or more predefined rules corresponding to the context of the chart data 209. Based on the form of analysis to be performed, the processor 109 may determine the appropriate one or more predefined rules and one or more predefined algorithms that should be triggered to perform the analysis to obtain the statistical data 215.

At block 307, the method 300 may include, generating, by the processor 109, insights of each of the one or more charts by mapping the statistical data 215 with one or more predefined narratives corresponding to the context of the chart data 209. The one or more predefined narratives provide a description of the statistical data 215 in natural language.

At block 309, the method 300 may include, generating, by the processor 109, the contextual summary of the one or more charts corresponding to the context of the chart data 209 in a predefined template format using the generated insights of each of the one or more charts. The insights generated are aggregated in the predefined template format that may include, but not limited to, three different sections "Good to know", "Key statistics" and "Key insights".

Figure 4:
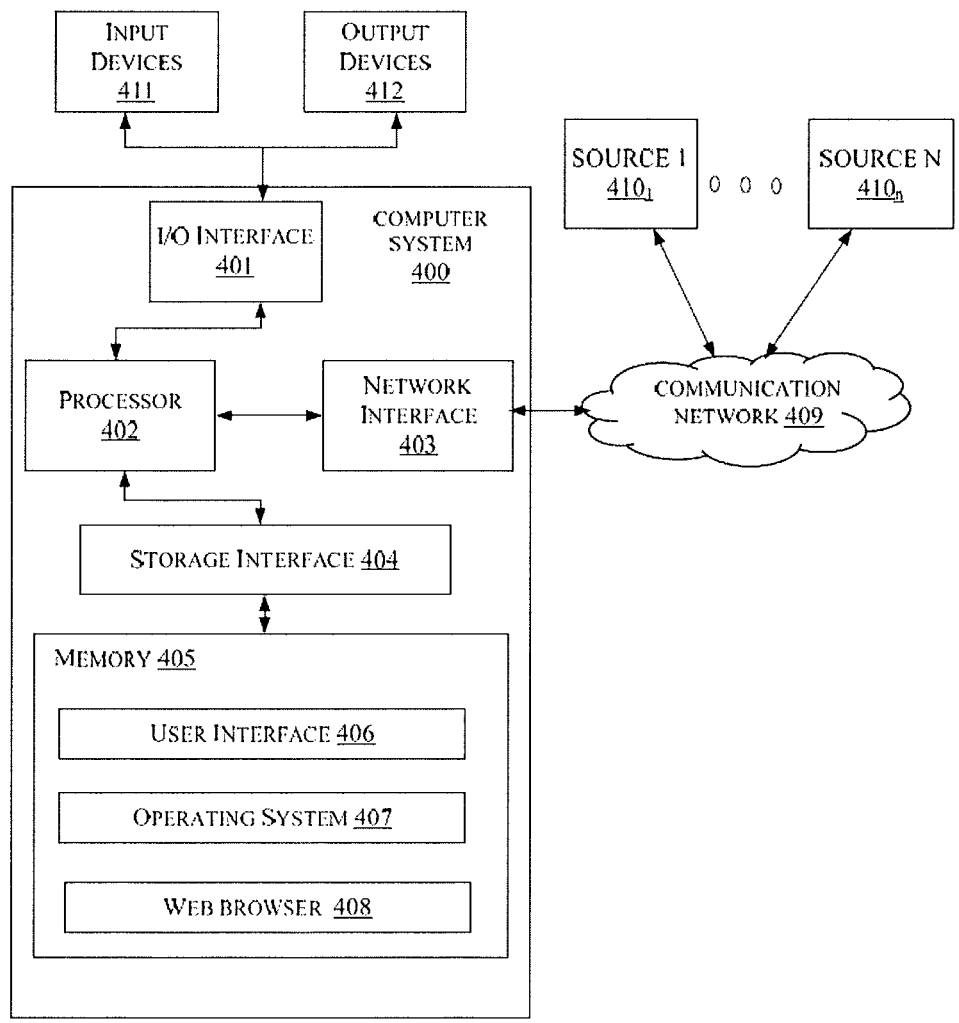
FIG. 4 is a block diagram of an exemplary computer system for implementing embodiments consistent with the present disclosure.

FIG. 4 is a block diagram of an exemplary computer system for implementing embodiments consistent with the present disclosure.

In an embodiment, FIG. 4 illustrates a block diagram of an exemplary computer system 400 for implementing embodiments consistent with the present invention. In an embodiment, the computer system 400 can be summary generating system 107 that is used for generating a contextual summary of one or more charts. The computer system 400 may include a central processing unit ("CPU" or "processor") 402. The processor 402 may include at least one data processor for executing program components for executing user or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (FISPA+), Global System For Mobile Communications (GSM), Long-Term Evolution (LTE), WiMax, or the like), etc.

Using the I/O interface 401, computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with one or more sources 4101 to 41 On (Also referred to as one or more sources 410). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more sources 410 may include, a repository that stores one or more charts and computing devices such as laptops, desktops, mobiles and the like that provide real-time charts. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 400 may implement the web browser 408 stored program components. The web browser 408 may be a hypertext viewing application, such as Microsoft Internet Explorer, Google Chrome, Mozilla Firefox, Apple Safari, etc. Secure web browsing may be provided using Secure Flypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the Embodiment of the Present Disclosure are Illustrated Herein.

In an embodiment, the present disclosure provides a method and a system for generating a contextual summary of one or more charts.

The present disclosure provides a feature wherein form of analysis to be performed, predefined rules to be followed and predefined algorithms to be used are automatically determined by the system based on context of the one or more charts.

The present disclosure provides a feature wherein the statistical data obtained based on the analysis is automatically interpreted and insights are provided to the end user in natural language.

The present disclosure provides a feature wherein the insights are aggregated in a predefined template format to provide a holistic summary of the interpreted charts.

A description of an embodiment with several components in communication with each other does not imply that all such components are required. On the contrary a variety of optional components are described to illustrate the wide variety of possible embodiments of the invention.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for generating a contextual summary of one or more charts. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be openended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What we claim is:

1. A method of generating a contextual summary of one or more charts, the method comprising:
   extracting, by a summary generating system (107), chart data (209) associated with each of the one or more charts received from one or more sources (103);
   determining, by the summary generating system (107), context of the chart data (209) based on one or more attributes of the chart data (209) and one or more characteristics corresponding to each of the one or more attributes;
   computing, by the summary generating system (107), statistical data (215) of each of the one or more charts by analysing the chart data (209) based on one or more predefined rules corresponding to the context of the chart data (209);
   generating, by the summary generating system (107), insights of each of the one or more charts by mapping the statistical data (215) with one or more predefined narratives corresponding to the context of the chart data (209); wherein the one or more predefined narratives provide a description of the statistical data (215); and
   generating, by the summary generating system (107), the contextual summary of the one or more charts in a predefined template format corresponding to the context of the chart data (209) using the generated insights of each of the one or more charts.

2. The method as claimed in claim 1, wherein the one or more charts comprise at least one of bar graph, pie chart, stacked chart, tree map, scatter plot chart, and trend analysis chart.

3. The method as claimed in claim 1, wherein the one or more attributes of the chart data (209) comprises at least one of numerical variables and categorical variables.

4. The method as claimed in claim 1, wherein the analysis of the chart data (209) comprises at least one of distribution analysis, inferential analysis, predictive analysis and prescriptive analysis.

5. The method as claimed in claim 1, wherein the analysing of the chart further comprises determining form of analysis to be performed on the chart data (209) based on the context of the chart data (209).

6. The method as claimed in claim 1, wherein the one or more predefined rules are updated based on requirement.

7. A summary generating system (107) for generating a contextual summary of one or more charts, the summary generating system (107) comprising:
   a processor (109);
   a memory (113) communicatively coupled to the processor (109), wherein the memory (113) stores the processor-executable instructions, which, on execution, causes the processor (109) to:
   extract chart data (209) associated with each of the one or more charts received from one or more sources (103);
   determine context of the chart data (209) based on one or more attributes of the chart data (209) and one or more characteristics corresponding to each of the one or more attributes;
   compute statistical data (215) of each of the one or more charts by analysing the chart data (209) based on one or more predefined rules corresponding to the context of the chart data (209);
   generate insights of each of the one or more charts by mapping the statistical data (215) with one or more predefined narratives corresponding to the context of the chart data (209); wherein the one or more predefined narratives provide a description of the statistical data (215); and
   generate the contextual summary of the one or more charts in a predefined template format corresponding to the context of the chart data (209) using the generated insights of each of the one or more charts.

8. The summary generating system (107) as claimed in claim 7, wherein the one or more charts comprise at least one of bar graph, pie chart, stacked chart, tree map, scatter plot chart, and trend analysis chart.

9. The summary generating system (107) as claimed in claim 7, wherein the one or more attributes of the chart data (209) comprises at least one of numerical variables and categorical variables.

10. The summary generating system (107) as claimed in claim 7, wherein the analysis of the chart data (209) comprises at least one of distribution analysis, inferential analysis, predictive analysis and prescriptive analysis.

11. The summary generating system (107) as claimed in claim 7, wherein to analyse the charts, the instructions further cause the processor (109) to determine form of analysis to be performed on the chart data (209) based on the context of the chart data (209).

12. The summary generating system (107) as claimed in claim 7, wherein processor (109) updates the one or more predefined rules based on requirement.

* * * * *